3,291,768
MULTILAYERED COATING COMPOSITION COMPRISING VINYLIDENE CHLORIDE
Helmuth L. Pfluger, Huntingdon Valley, and Charles G. Gebelein, Philadelphia, Pa., assignors to The Borden Company, New York, N.Y., a corporation of New Jersey
No Drawing. Filed Oct. 1, 1962, Ser. No. 227,532
12 Claims. (Cl. 260—29.6)

This invention relates to a multilayered copolymer including vinylidene chloride and an ester of an ethenoid acid and the process of making the copolymer.

The invention is useful in providing a coating for paper or the like. Such coating should be resistant to the passage of water and other vapors, gases, greases and oils, when used, for example, on a paper wrapper or container for foods, soaps, and such products.

There has been difficulty heretofore in making a coating in a single application which has these properties and also can withstand creasing of the film without losing MVTR (moisture vapor transmission resistance) in the creased zone and that will not block (not adhere to adjacent coated sheets) during usual handling and stacking. The present invention provides a latex that, in a single application, dries to a film meeting the requirements.

The invention comprises the herein described process of and product resulting from forming a polymeric resin, in generally concentrically layered, minute particles. The inner or core material consists largely of polyvinylidene chloride. The resin polymerized thereon and therearound contains a copolymer of vinylidene chloride with a substantial proportion of an acrylate or like ester. While the particles have two or more layers, the preferred embodiment of the invention makes and uses emulsified particles that have three roughly concentric layers and the proportion of acrylate ester to the vinylidene chloride in the outermost layer is greater than that in the inner or core layer.

In the composite described, the rate of crystallization of the resin in the cold is faster in the core than the rate, if any, in the outer layer. In the latex as made and used, the crystallite has already formed in the inner core before the latex is used; the intermediate layer, if used, may be partly crystallite but show a tendency to decrystallize under the influence of the forces to which it is subjected during the evaporation in formation of the film; and the outer layer is ordinarily either crystallite to a small extent only or not at all.

The crystallite nature of the parts referred to is determined by X-ray diffraction or by a characteristic of the infrared spectrum which appears when crystallization occurs.

MATERIALS AND PROPORTIONS

The polymeric vinylidene chloride is the principal component of the multi-layered particles.

The ester of the ethenoid acid may be any $C_1$–$C_{18}$ alkyl ester of any $C_3$–$C_8$ alpha-unsaturated aliphatic acid, e.g., acrylic, methacrylic, itaconic, fumaric, maleic, crotonic, citraconic, and mixtures thereof, with which there may be admixed some benzyl, tolyl, or like aryl esters of the same ethenoid aids, as, for instance, 1%–50% of the aryl ester on the weight of the alkyl ester.

When an alkyl ester of metacrylic acid is used and the alkyl group has less than 4 carbon atoms, an acrylate ester is admixed for its flexibilizing effect.

The initiator used in the copolymerizations herein described is any one of those that are water soluble and usual for polymerizing ethenoid bond monomers by emulsion technique. Examples of such initiators are hydrogen peroxide in combination with ascorbic or erythorbic acid in a redox system, tertiary butyl hydroperoxide with ascorbic acid, sodium, potassium or ammonium bisulfites, and formaldehyde sulfoxylate. The initiator is used in the proportion of about 0.05%–0.3% of the weight of total monomers used.

The surfactant or emulsifier is any one that is conventional in suspending acrylic and vinyl monomers in emulsion polymerization. Examples are Duponol WAQE, the sodium salt of lauryl alcohol sulfate; Triton 770, sodium salt of alkyl aryl polyether sulfate; Triton X-100, isooctylphenyl polyethoxy ethanol; Aerosol 22, tetrasodium N-(1,2-dicarboxyethyl)N-octadecylsulfosuccinate; Tergitol NPX, nonylphenyl polyethyleneglycol ether; Cyanamid anionic DN; Alipal CO-436, ammonium salt of an alkyl (e.g., ethyl) phenoxy polyoxyethylene ethanol; and Tergitol 3–A–9, polyoxyethylated tridecyl alcohol. Where the emulsifier contains a polyether, polyethoxy, or polyoxyethyl group, this component has suitably 10–100 ethoxy or like alkoxy groups per mole.

Recommended proportions of the several monomers and relative weights of core and surrounding layer or layers are shown in the following table:

| Position in The Particle | Parts for 100 Parts Total Monomers | | Weight of Core or Layer |
|---|---|---|---|
| | Vinylidene Chloride | Ethenoid Acid Ester | |
| Core | 92–100 | 0–8 | 10–40, e.g., 15. |
| Layer II (around core) | 70–90 | 10–30 | 30–70, e.g., 60. |
| Layer III (around II) | 60–85 | 15–40 | 0–50, e.g., 10–35. |

PROCESS OF FORMING LAYERED PARTICLES

In the water to constitute the dispersion medium, there are admixed the emulsifying agent and part at least of the initiator. The air is flushed from the container, so as to establish a nonoxidizing atmosphere. Then the vinylidene chloride is introduced slowly and with vigorous stirring, either alone or with acrylate ester, in the proportion shown in the table later herein.

The whole is maintained at a temperature at which the monomer polymerizes, as at 20°–70°, under a reflux condenser with a Dry Ice and ether mixture as cooling medium. The mix is stirred vigorously until the vinylidene chloride introduced is substantially completely polymerized.

Then there is introduced slowly the mixture of monomers, vinylidene chloride and an ethenoid acid ester of kind described, to provide the enclosing layer. The same conditions are repeated as before, until the selected amount of the mixed monomers have been supplied and substantially completely polymerized with each other or with surface portions of the previously formed polyvinylidene chloride core particles.

When a three-layered product is to be made, there is introduced the Mixture II. This third composition is again a mixture of vinylidene chloride with an ethenoid acid ester, said ester being ordinarily in larger proportion than in Mixture II. The polymerization technique is again repeated, until there is formed the finished particle including the core and the two outer layers.

Electron microscope studies after successive steps of the multistage polymerization show, within the limits of accuracy of the observations, that essentially no new particles of polymeric material are formed after the preparation of the core or seed particles.

The invention will be further illustrated by description in connection with the following specific examples of the practice of it, proportions here and elsewhere herein being expressed as parts by weight.

Example 1

The compositions used for forming the core of the particles, the first coat therearound (Mixture II), and the additional outer coat (Mixture III) are shown in the following table.

| Ingredient | Parts by Weight In— | | |
|---|---|---|---|
| | Core Mixture | Mixture II | Mixture III |
| Deionized water | 490.8 | | |
| Duponol WAQE (25% sol.) | 17.6 | | |
| Vinylidene chloride | 82.7 | 262.2 | 131.4 |
| Hydrogen peroxide (35% sol.) | 1.7 | | |
| Ascorbic acid (5% sol.) | 6.6 | 1.5 | 0.8 |
| 2-ethylhexyl acrylate | | 26.1 | |
| Methyl methacrylate | | 13.3 | |
| Ethylacrylate | | | 33.2 |
| Total | 599.4 | 303.1 | 164.6 |

The core composition is first emulsion-polymerized, to form the seeds, after which the Mixtures II and III, in that order, are copolymerized around and on the material previously polymerized.

In making the seeds that are to constitute the cores of the particles in the finished emulsion, the water is introduced into a glass-lined kettle and the air therein is flushed out with nitrogen. Then there is added about a fourth of the total quantity of the Duponol to serve as the emulsifier, the agitator started, the temperature control in the jacket of the said kettle set for 30° C., the kettle tightly closed at an inside pressure of about 2 p.s.i., and the vinylidene chloride is then introduced slowly under nitrogen pressure.

When the mix so formed is at about 30° C., there is admixed the hydrogen peroxide solution and, about 5 minutes later, half of the ascorbic acid, these materials being representative of conventional initiators of ethenoid polymerization that we can use.

As stirring is continued, an exothermic reaction occurs.

The emulsifier and the accelerators are added to advantage in portions, as may be required, during the progress of the mixing, to maintain stability of the emulsion and also avoid excessive rise in temperature. The vapor pressure rises to a maximum of about 20 to 25 p.s.i. at 40°–45° C. and then, as the reaction is completed, the vapor pressure and also the temperature fall, as to about 5 p.s.i. and 30° C. respectively.

After the vapor pressure and the temperature have ceased to rise and have actually fallen, as stated, e.g., after a total reaction time of 2 hours, there is introduced 149 parts of the Mixture II, the monomers being admixed first at the rate of about 4 parts total per minute and later the ascorbic acid and other components as required to maintain the desired reaction rate and temperature of about 45° C.

The whole is stirred for 30 minutes.

When the vapor pressure has risen to about 20 p.s.i. and again fallen to less than 8 p.s.i. and the temperature has begun to decline from the maximum of about 48° C., then the remainder of the monomers in Mixture II are introduced over a period of 60 minutes after which the rest of the ascorbic acid and other unused materials of the formula are admixed.

The whole is then stirred for 30 minutes after which the Mixture III components are introduced gradually and the temperature maintained at about 30°– 40° C. The whole is stirred for 30 minutes and then cooled to about 27° C. The resulting latex is then drained from the kettle and is ready for use as a coating.

This latex is applied as a single coat to usual kind of wrapping material such as paper and the water in the latex then evaporated at room temperature or on warming, e.g., to 160° C. for 15 sec. or at 80° C. for 1 minute. The resulting film coalesces into a flexible coating that retains the property of the crystallite polyvinylidene chloride as a barrier to the passage of moisture, vapors, greases, or oils or the like referred to earlier herein. We explain this barrier effect to the close spacing of the barrier seeds or cores of polyvinylidene chloride in the dried film of polyvinylidene chloride and the retention of this MVTR on repeated creasing and to the fact that the exteriors of the particles are more flexibilized by the acrylate component than are the interior crystallite portions thereof.

Example 2

The procedure and composition of Example 1 are again used except that some methacrylic acid is introduced.
The formula used was as follows:

| Ingredient | Parts by Weight In— | | |
|---|---|---|---|
| | Core Mixture | Mixture II | Mixture III |
| Deionized water | 490.8 | | |
| Duponol WAQE (25% sol.) | 17.6 | | |
| Vinylidene chloride | 82.7 | 262.2 | 131.4 |
| Methacrylic acid | 1.1 | 1.5 | 0.7 |
| Hydrogen peroxide (35% sol.) | 1.7 | | |
| Ascorbic acid (5% sol.) | 6.6 | 1.5 | 0.8 |
| 2-ethylhexyl acrylate | | 26.1 | |
| Methyl methacrylate | | 13.3 | |
| Ethylacrylate | | | 33.2 |
| Total | 600.5 | 304.6 | 165.3 |

All procedures were exactly as described in Example 1.

In modifications of this example, the proportions of the acid are varied from 0.2%–5% of the total polymeric material.

In one modification of this example the methacrylic acid is replaced by an equal weight of any other $C_3$–$C_8$ alpha-unsaturated aliphatic acid. Examples of such other acids that may be used are acrylic, itaconic, maleic, and fumaric, crotonic and citraconic acids.

Example 3

The procedure and composition of Example 1 are followed except that the use of the Mixture III and the formation of the third layer of material in the copolymer particles are omitted. The resulting two-layer film has the desired barrier resistance but lacks the flexibility required for withstanding severe creasing without loss of such resistance.

Example 4

The procedure and composition of Example 1 are used exactly, except that proportions of the monomers to each other in the several mixtures are varied as shown in the table below.

| Monomer Used | Percentage of Total Monomers | | |
|---|---|---|---|
| | Core Mixture | Mixture II | Mixture III |
| Vinylidene Chloride | 97 | 90 | 85 |
| Ethyl acrylate | 0 | 10 | 15 |
| Methyl methacrylate | 3 | 0 | 0 |

Other parts of the formula are as shown in Example 1.

A suitable distribution of the comonomers in the several mixtures in percentage of total comonomers are as follows: Core mixture, 15%; Mixture II, 30%; and Mixture III, 55%.

A Mixture IV may be made and applied over the third layer in the particle, such Mixture IV having the monomers in the ratio to each other as follows: Vinylidene chloride 80% and ethyl acrylate 20% and the total monomer content of the Mixture IV being about 60% of that of the other three mixtures.

Example 5

The procedure and composition of Example 1 are used except that the monomers and the percentages of the total monomers, in the several mixtures are as follows:

| Monomer Used | Percentage of Total Monomers | | |
| --- | --- | --- | --- |
| | Core Mixture | Mixture II | Mixture III |
| Vinylidene Chloride | 100 | 88 | 80 |
| Ethyl acrylate | | | 15 |
| Dibutyl itaconate | | 12 | 5 |
| Total parts of monomers, percent of total used | 15 | 45 | 40 |

The multilayer particles made as described and with the formulas are effective in resistance to passage of moisture and grease, satisfactory in such resistance after creasing and satisfactory also in being non-blocking.

A film made from any of our combinations of monomers but blended in about the same proportions throughout the entire particles fail to show the combination of properties stated above.

MAKING COATED SHEETS

In the application of the latex made as described to paper the following procedure is representative.

There is first provided a wood pulp or other paper, the term including paper board, that has been processed on a face thereof so as to avoid excessive absorption of the latex therethrough. Thus the paper may be calendered over the surface to which the latex is to be applied. In an alternative procedure the surface of the paper may be pretreated, as with a surface sizing composition or the application of a thin film of polyethylene, polypropylene, polyethylene terphthalate, nylon, or other flexible plastic. In any case the latex is applied to the surface and evened out by means of a doctor blade or a device using air to level off the film (sometimes called "air blade" or "air doctor"). The paper with the applied coating then passes in usual manner over or through the drying parts of the paper making equipment, after which drying the product is ready for use as a wrapper or in the preparation of containers for food and the like.

In a representative test, a paper was treated with the emulsion of kind described at the rate of 12 pounds dry weight for 3,000 square feet of paper; the paper so coated was dried. The paper was then exposed on one side to air at a relative humidity of 100% and temperature 100° F., while the other side was exposed to desiccated air over fused calcium chloride granules. In 24 hours of such exposure, the moisture that passed through the paper corresponded to only 0.3 gram for 100 square inches thereof.

In another use, cellophane (transparent cellulose sheeting) is substituted for the paper, the latex made as described being applied directly to the surface of the cellophane without any intermediate processing of the cellophane.

In another use the latex is likewise applied to sheeting of other plastic wrapping material, e.g., to films of polyvinyl chloride plasticized with about 10%–20% of 2-ethylhexyl phthalate or the like, polyvinylidene chloride, polyethyl acrylate, and the copolymer of vinyl chloride and vinylidene chloride known as Saran.

The amounts applied to paper or plastic sheets described may be varied over a wide range, a representative application being about 5–20 pounds dry weight for 3,000 square feet of the paper or plastic sheeting.

It will be understood that it is intended to cover all changes and modifications of the examples of the invention herein chosen for the purpose of illustration which do not constitute departures from the spirit and scope of the invention.

We claim:

1. A latex comprising resinous and multilayered particles for preparation of coatings and film resistant to passage therethrough of moisture and grease, and retentive of such resistance after creasing, said particles comprising an inner layer of a resin selected from the group consisting of:
   (1) polyvinylidene chloride;
   (2) interpolymers of vinylidene chloride and ester of $C_3$–$C_8$ alpha-unsaturated aliphatic acid; and
   (3) interpolymers of an acid selected from the group consisting of acrylic, methacrylic, itaconic, maleic, fumaric, crotonic, and citraconic acid with materials selected from the group consisting of
      (a) vinylidene chloride;
      (b) ester of $C_3$–$C_8$ alpha-unsaturated aliphatic acid; and
      (c) mixtures of (a) and (b);
and an outer layer of a resin selected from the group consisting of:
   (1) interpolymers of vinylidene chloride and ester of $C_3$–$C_8$ alpha-unsaturated aliphatic acid; and
   (2) interpolymers of an acid selected from the group consisting of acrylic, methacrylic, itaconic, maleic, fumaric, crotonic, and citraconic acid with materials selected from the group consisting of
      (a) vinylidene chloride;
      (b) ester of $C_3$–$C_8$ alpha-unsaturated aliphatic acid; and
      (c) mixtures of (a) and (b);
the proportion of said vinylidene chloride being higher in an inner layer of said particles than in an outer layer thereof.

2. The latex of claim 1, the said ester being a $C_1$–$C_{18}$ alkyl ester of an acid selected from the group consisting of acrylic, methacrylic, itaconic, maleic, fumaric, crotonic and citraconic acids.

3. The latex of claim 1, said particles having a core, an additional layer there around, and an outer layer, the proportion of said vinylidene chloride for 100 parts of said vinylidene chloride and said interpolymers being about:
   (1) 92–100 parts in said core;
   (2) 70–90 parts in said additional layer; and
   (3) 60–85 parts in said outer layer.

4. The latex of claim 1 the proportion of said acid being 0.2%–5% of the total weight of the total of the polymeric material.

5. The latex of claim 1, said latex being emulsified, and said ester being ethyl acrylate.

6. The latex of claim 1, said latex being emulsified, and said ester being dibutyl itaconate.

7. The latex of claim 1, said latex being emulsified, and said ester being methyl methacrylate and 2-ethylhexyl acrylate.

8. An article resistant to the passage of moisture therethrough, comprising a sheet of material selected from the group consisting of paper, polyethylene, polypropylene, nylon, and polyethylene terephthalate and a dried film of the latex of claim 1 as a continuous coating over a face of the sheet.

9. The article of claim 8, said sheet being paper.

10. The process of making a multi-layered emulsified particle in latex form comprising the steps of:
   (A) forming an aqueous emulsion containing (a) surfactant, (b) initiator of polymerization of ethenoid monomers, (c) and seed monomers selected from the group consisting of:
      (1) vinylidene chloride;
      (2) ester of $C_3$–$C_8$ alpha-unsaturated aliphatic acid; and
      (3) acid selected from the group consisting of acrylic, methacrylic, itaconic, maleic, fumaric, crotonic, and citraconic acid;
   (B) maintaining the emulsified materials in contact with each other until said seed monomers are polymerized so as to provide seed particles;

(C) introducing emulsifying layered monomers selected from the group consisting of:
   (1) vinylidene chloride;
   (2) ester of $C_3$–$C_8$ alpha-unsaturated aliphatic acid; and
   (3) acid selected from the group consisting of acrylic, methacrylic, itaconic, maleic, fumaric, crotonic, and citraconic acid;
(D) maintaining contact between said seed particles and said layered monomers until said layered monomers are polymerized around and upon said seed particles.

11. The process of claim 10 wherein the proportion of vinylidene chloride in said seed monomer, for 100 parts of said seed monomer is about 92–100 parts.

12. The process of claim 11, said ester being ethyl acrylate.

References Cited by the Examiner
UNITED STATES PATENTS

| | | | |
|---|---|---|---|
| 2,894,927 | 7/1959 | Elder et al. | 260—29.6 |
| 2,909,449 | 10/1959 | Franklin | 260—29.6 |

MURRAY TILLMAN, *Primary Examiner.*

N. F. OBLON, *Assistant Examiner.*